US010601004B2

(12) United States Patent
 Lindemann

(10) Patent No.: US 10,601,004 B2
(45) Date of Patent: Mar. 24, 2020

(54) HOUSING COMPRISING A BATTERY COMPARTMENT

(71) Applicant: INTERDIGITAL CE PATENT HOLDINGS, Paris (FR)

(72) Inventor: Robert Lindemann, Wiesbaden (DE)

(73) Assignee: INTERDIGITAL CE PATENT HOLDINGS, Paris (FR)

(*) Notice: Subject to any disclaimer, the term of this patent is extended or adjusted under 35 U.S.C. 154(b) by 279 days.

(21) Appl. No.: 15/520,308

(22) PCT Filed: Sep. 18, 2015

(86) PCT No.: PCT/EP2015/071469
 § 371 (c)(1),
 (2) Date: Nov. 20, 2017

(87) PCT Pub. No.: WO2016/062469
 PCT Pub. Date: Apr. 28, 2016

(65) Prior Publication Data
 US 2018/0114958 A1  Apr. 26, 2018

(30) Foreign Application Priority Data
 Oct. 22, 2014 (DE) .......... 10 2014 221 464

(51) Int. Cl.
 *H01M 2/10* (2006.01)
(52) U.S. Cl.
 CPC ......... *H01M 2/1022* (2013.01); *H01M 2/105* (2013.01); *H01M 2/1016* (2013.01); *H01M 2/1055* (2013.01); *H01M 2220/30* (2013.01)

(58) Field of Classification Search
 CPC ............... H01M 2/1016; H01M 2/105; H01M 2220/30; H01M 2/1022; H01M 2/1055
 USPC ......................................................... 429/176
 See application file for complete search history.

(56) References Cited

U.S. PATENT DOCUMENTS

| 5,256,953 A | 10/1993 | Cimbal et al. |
| 6,929,878 B2 | 8/2005 | Chen et al. |
| 2007/0122693 A1 | 5/2007 | Qin et al. |
| 2008/0033248 A1 | 2/2008 | Akagi |
| 2010/0086839 A1 | 4/2010 | Wu et al. |
| 2011/0082657 A1 | 4/2011 | Ito |
| 2011/0293116 A1 | 12/2011 | Matsui et al. |

FOREIGN PATENT DOCUMENTS

| CN | 1692508 | 11/2005 |
| CN | 1971974 A | 5/2007 |
| CN | 101937978 | 1/2011 |
| CN | 201699065 | 1/2011 |
| DE | 4104883 | 8/1992 |

(Continued)

*Primary Examiner* — Jonathan G Jelsma
*Assistant Examiner* — Omar M Kekia
(74) *Attorney, Agent, or Firm* — Jeffrey M. Navon

(57) ABSTRACT

The invention relates to a housing comprising a battery compartment (102) that can be closed by a pivotable cover (103). A torsion-resistant strip (117) connects the cover (103) to the housing. When the battery (127) has been inserted, the strip (117) lies underneath the battery (127). The cover (103) can be detached from the housing, but is captively connected to the housing by means of the strip (117). The cover (103) forms a handle, by means of which batteries (127) can be removed simply from the battery compartment (102) in conjunction with the strip (117).

17 Claims, 3 Drawing Sheets

(56) References Cited

FOREIGN PATENT DOCUMENTS

| | | |
|---|---|---|
| DE | 19739581 | 11/1998 |
| DE | 102011081958 | 5/2012 |
| EP | 1850406 | 10/2007 |
| EP | 2619108 | 7/2013 |
| JP | S51079627 U | 6/1976 |
| JP | 6196655 | 5/1986 |
| JP | S62193057 A | 8/1987 |
| JP | H10255747 A | 9/1998 |
| JP | 200439598 | 2/2004 |
| JP | 2011081958 A | 4/2011 |
| JP | 2011249180 A | 12/2011 |
| WO | WO2006087885 A1 | 8/2006 |
| WO | WO2012040289 | 3/2012 |

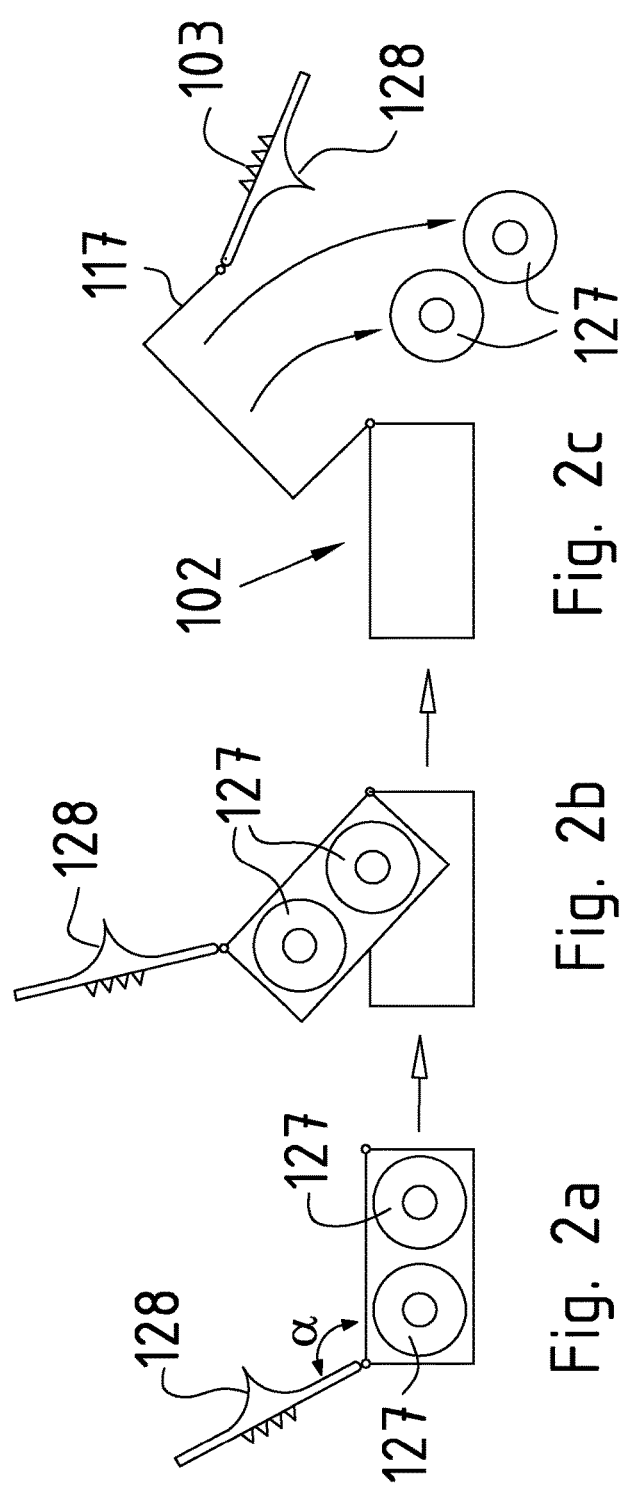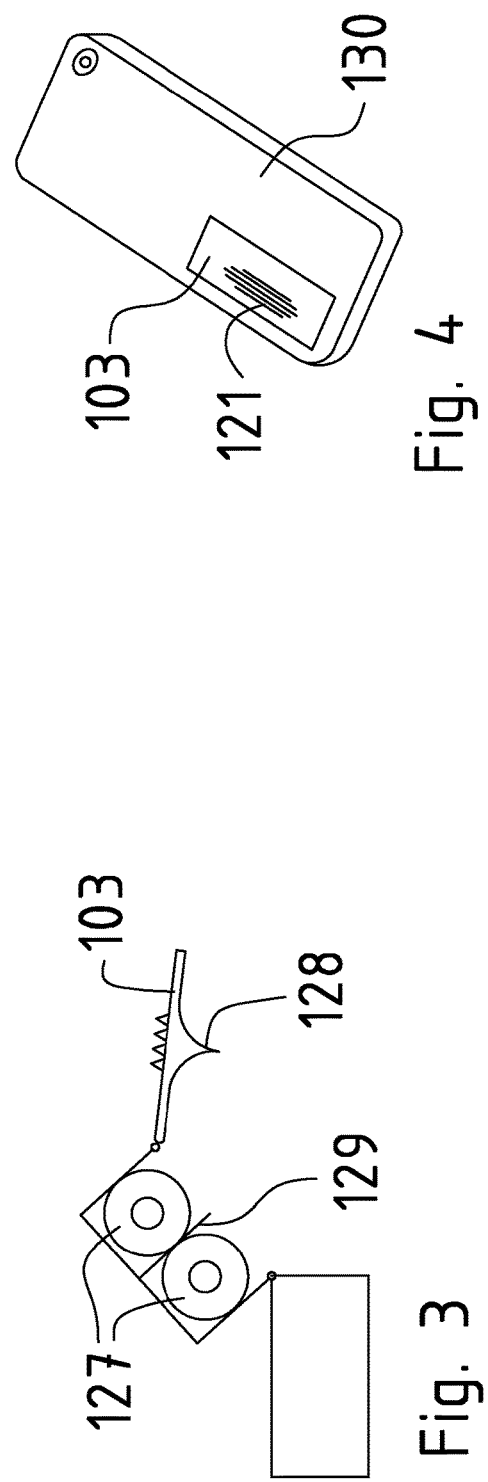

HOUSING COMPRISING A BATTERY COMPARTMENT

This application claims the benefit, under 35 U.S.C. § 365 of International Application PCT/EP2015/071469, filed Sep. 18, 2015, which was published in accordance with PCT Article 21(2) on Apr. 28, 2016, in German, and which claims the benefit of German Patent Application No. 102014221464.5 filed Oct. 22, 2014.

TECHNICAL FIELD

The present invention relates to a housing comprising a battery compartment which can be closed by a cover. More particularly, the invention relates to such a housing for a portable electric device.

BACKGROUND

Many portable electric devices are operated by batteries. These batteries are either primary batteries which generate electric energy by means of a chemical reaction or secondary batteries which, initially, are charged by another power source and can give off the stored electric energy. In the first case, the batteries must be replaced once they are depleted. The same applies to the second case if the electric device does not provide any external charging connection. This is, for example, often the case in remote controls for devices in entertainment electronics or electric clocks. In such devices, the batteries are usually accommodated in a battery compartment which can be opened by detaching, sliding out or pivoting a cover. Once the battery compartment has been opened, the batteries are accessible to the user. The user can then remove the batteries from the battery compartment and replace them by new or charged batteries. Usually, however, the battery compartments mentioned are very tight to save space in the housing of the device. Furthermore, depleted batteries must be removed from the tight housing against the clamping force of springy electric contracts. This task is not easy for persons having age- or disease-related restricted manual skills. The present invention therefore proposes a housing comprising a battery compartment which facilitates this task.

SUMMARY OF THE INVENTION

Proposed is a housing comprising a battery compartment which can be closed by a pivotable cover. A torsion-resistant strip connects the cover to the housing such that the strip lies underneath the battery when the battery has been inserted. The cover can be detached from the housing and is captively connected to the housing by means of the strip.

In one embodiment, the strip is fastened to the housing at a side edge of the cover and within the battery compartment on a first side wall of the battery compartment, said first wall being opposite to a second side wall of the battery compartment, at which the cover is hinged.

In an appropriate embodiment, the cover has arms which engage in openings in the battery compartment in such a way that the cover is pivotably connected to the housing up to a predetermined opening angle of the cover. Only when the cover is pivoted beyond the predetermined opening angle can the cover be detached from the housing. When the cover is detached from the housing, it serves as a gripping piece for a user to allow said user to lift the batteries out of the battery compartment by means of the strip.

Advantageously, the arms can be designed conically towards their free end to facilitate inserting the arms into the associated openings in the housing.

The cover can be prestressed by spring means into the open positioning to facilitate opening the cover because it bursts open into an open position after a closure has been released.

In an advantageous embodiment, the cover has a non-slip surface structure which provides gripping surfaces. The non-slip surface structure reduces the pressing force a user has to exert with his or her fingers to hold the cover while removing the batteries. Appropriately, the non-slip surface structure is provided on either side of the cover.

In one embodiment, the strip is a plastic strip composed of a plurality of segments which are connected to one another by joints. In this case, the joints are, preferably, resilient and bias the plastic strip into a stretched position. In an advantageous refinement, the joints are designed as film hinges.

The battery compartment is to advantage in that it has a recess which receives the plastic strip when the battery is inserted such that the wall or bottom surface of the battery compartment is flat.

In one advantageous embodiment, the cover is provided with a positioning rib which simultaneously serves as a surface helping the user to hold the cover while removing the batteries.

The strip can be to advantage in that it provides a fixing bar which holds the battery. The fixing bar prevents the batteries from falling once they have been lifted out of the battery compartment.

Further advantages and features will be disclosed in the detailed description of a plurality of embodiments of the proposed housing.

BRIEF DESCRIPTION OF THE DRAWING

The drawing shows the embodiments of the invention. In the Figures,

FIGS. 2A to 2C are cross-sectional views of a modified embodiment of the battery compartment of FIG. 1A;

FIG. 3 is a cross-sectional view of a further modified embodiment of the battery compartment of FIG. 1A; and FIG. 4 shows a mobile electronic device comprising a housing according to the invention.

In the figures, same or similar parts have the same and similar reference symbols, respectively.

DETAILED DESCRIPTION

Figure 1A:
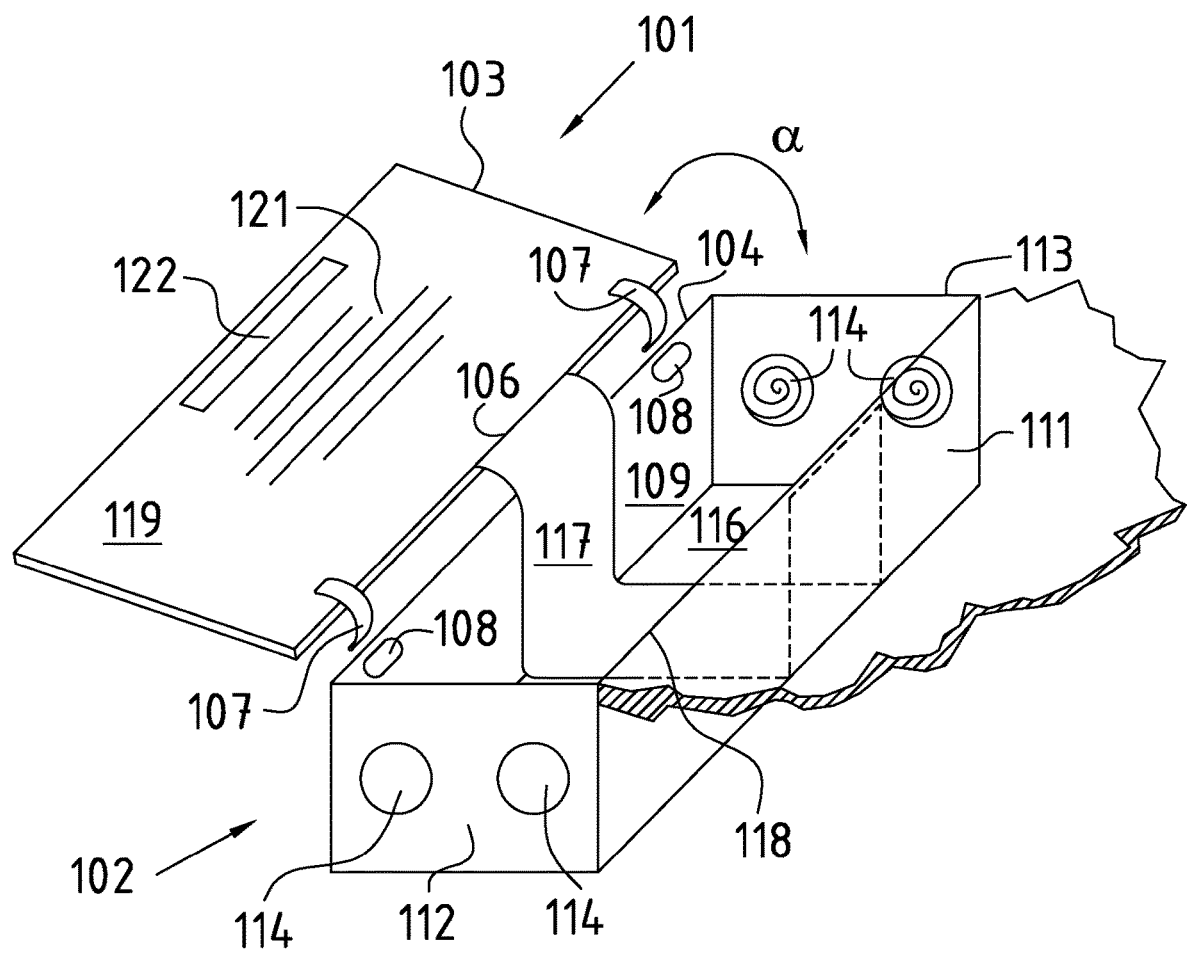
FIG. 1A is a perspective top view of a detail of a housing according to the invention comprising a battery compartment.

FIG. 1A shows a detail 101 of a housing according to the invention comprising the associated battery compartment 102. The parts of the housing not shown in FIG. 1A are conventional parts and irrelevant for the present invention. The cuboid battery compartment 102 has a pivotable cover 103 which is arranged at an upper edge 104 of the battery compartment 102. At a side edge 106 of the cover 103 facing the upper edge 104, the cover 103 has two arms 107 which engage in allocated openings 108 and, in cooperation with the openings 108, form hinged joints about which the cover 103 can be pivoted. Furthermore, the arms serve to lock the cover when the cover is closed. The battery compartment 102 has a first side wall 111 which is opposite to a second side wall 109 as well as two front sides 112, 113 which are provided with electric contacts 114. The openings 108 are arranged in the second side wall 109. Finally, the battery compartment 102 is provided with a bottom 116. A particular feature of the battery compartment 102 is a strip 117 which extends from an upper edge 118 of the side wall 111 along the bottom 116 to the side edge 106 of the cover 103. With its respective ends, the strip 117 is fastened to the upper edge 118 and the side edge 106 of the cover 103, respectively. The strip 117 is designed torsionally resistant in its longitudinal direction; in its transverse direction, however, it is deformable so that it adjusts to the contour of the interior of the battery compartment 102.

On its two main surfaces 119, the cover 103 has structured gripping surfaces 121 which provide the user's fingers with a non-slip hold. The main surface 119 of the cover 103 facing the interior of the battery compartment has a notched bar 122 allowing the cover 103 to get latched when it is closed.

The arms 107 are formed such that the cover 103 is pivotably connected to the housing up to a predetermined opening angle α of, for example, 120° of the cover 103. As a matter of course, the predetermined opening angle α mentioned can be selected smaller or wider in other embodiments. Only when the cover 103 is pivoted beyond the predetermined opening angle α will the arms 107 be released from the openings 108 and can the cover 103 be detached from the housing. This is indicated in FIG. 1A by the cover 103 being represented at a short distance from the battery compartment 102 and the arms 107 no longer engaging in the openings 108.

Figure 1B:
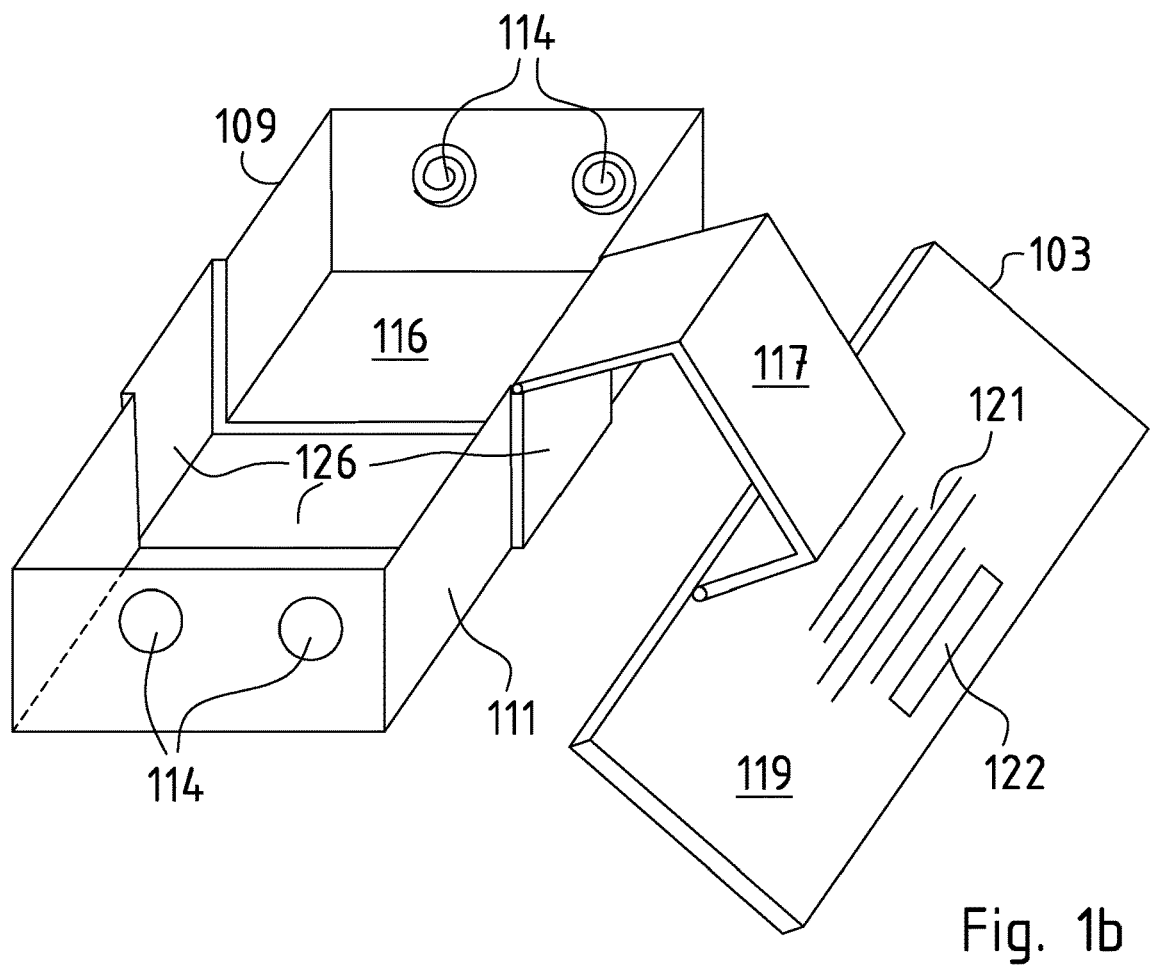
FIG. 1B is a cross-sectional view of the battery compartment of FIG. 1A with the cover detached.

Once the arms 107 are released from the openings 108, the user can move the cover upwards and to the right until it reaches the position that is, for example, shown in FIG. 1B. It is obvious that, in the course of the opening movement, the batteries (not shown in FIGS. 1A and 1B) inserted in the battery compartment 102 are taken along and lifted out of the battery compartment 102 by the strip 117. The cover 103 provides the user with large and non-slip gripping surfaces 121 for this movement, with the result that even a user suffering from a restricted mobility of his or her fingers or having restricted manual skills can easily overcome the clamping force which the electric contacts 114 exert on the batteries. This arrangement requires much less force in a user's fingers for removing the batteries from the battery compartment than this is the case with conventional battery compartments. This is a considerable advantage for all of those persons who can exert only little force with their fingers.

FIG. 1B shows the strip 117 as a rigid U-profile. Such an embodiment of the invention is generally conceivable. However, a rigid U-profile is to disadvantage in that it involves a high risk of breakage, in particular for persons whose manual skills are restricted and particularly form a target group for the proposed housing.

Figure 1C:
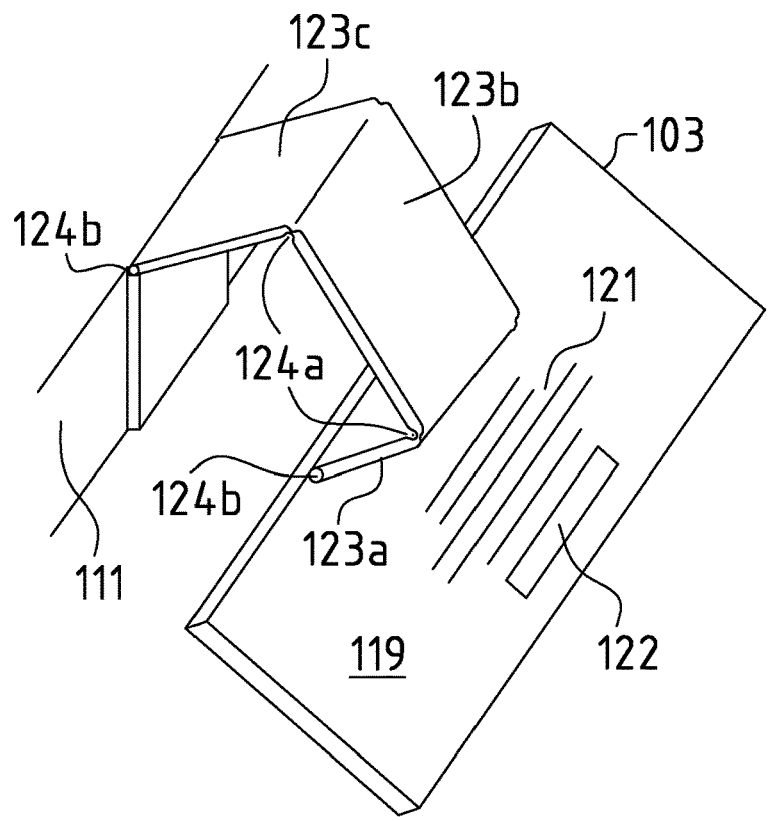
FIG. 1C shows a detail of a modified embodiment of the battery compartment of FIG. 1B.

For this reason, a further embodiment of the strips 117 a detail of which is shown in FIG. 1C is formed from three individual segments 123a, 123b and 123c which are connected to one another by joints that are formed as film hinges 124a and are hinged at the side wall 111 and the cover 103, respectively, by the joints 124b. In this embodiment, the joints 124b are also formed as film hinges. In the embodiments comprising a strip composed of the segments 123a, 123b and 123c, the strip 117 is only deformable in the vicinity of the joints or film hinges 124a, 124b.

One segment each forms one of the two legs or the bar, respectively, of the U-profile. For such a plastic strip 117 that is composed of segments, the risk of breakage is only very small. Nevertheless, it fulfills the function of lifting an inserted battery out of the battery compartment 102 by means of the cover 103 in an equally perfect manner.

Batteries are inserted into the battery compartment in a reverse order of movements as compared with the lifting out of the batteries. The cover 103 is returned to its initial position, wherein the strip 117 folds into the interior of the battery compartment. The batteries can then be pressed into the battery compartment 102 from above, which requires considerably less manual skills than the lifting out of the batteries from a tight battery compartment. Once the batteries are inserted, the arms 107 of the cover 103 are introduced into the openings 108 and the cover is closed, wherein the notched bar 122 gets latched and holds the cover 103 closed. The torsion-resistant strip 117 facilitates the introducing of the arms 107 into the openings 108 because it helps the user to guide the cover and the arms 107, respectively, into the proper position. This also facilitates closing the cover properly.

The fact that the cover 103 suspends from the strip 117 in a loose but captive manner after the batteries have been removed, causes the user prior to inserting the batteries to return the cover into its operating position, i.e., to introduce the arms 107 into the openings 108. Therein, the strip 117 places itself into the battery compartment and, thereby, comes to lie underneath the subsequently inserted batteries. In addition, the arms 107 can be configured such that even if the cover is in a slightly offset position with regard to the battery compartment, the cover is automatically positioned correctly when it is closed. To achieve this, the arms 107 are, for example, designed conically. Even if the cover has only incompletely been put into its operating position before the batteries are inserted, the bar 129 that has been pressed down by the inserted batteries 127 and the arms 107 will result in a correct positioning of the cover 103.

In a further embodiment, the strip 117 is designed as a textile tape which, in its transverse direction, is flexible enough to be able to adjust to the inner contour of the battery compartment and, at the same time, has a torsional resistance that suffices to guide the cover 103 to the correct position to ensure that the arms 107 reliably find their way into the openings 108.

FIG. 1B shows the battery compartment such that a recess 126 can be seen in its interior, said recess 126 being configured such that the recess 126 completely receives the strip 117 and the bottom and the side walls of the battery compartment are flat. This ensures that the batteries, once inserted, do not rattle in the battery compartment.

FIGS. 2A to 2C are cross-sectional views of the battery compartment of the housing according to the invention. FIG. 2A shows two batteries 127 which lie inside the battery compartment 102. The cover 103 is pivoted to an open position. In FIG. 2B, the cover 103 has been detached from the battery compartment and moved upwards, wherein the strip 117 lifts the batteries out of the battery compartment. Finally, FIG. 2C shows how the batteries can be easily removed from the strip 117.

In the embodiment shown in FIGS. 2A to 2C, the cover 103 is furthermore provided with a positioning rib 128 which additionally positions and fixes the inserted batteries in the battery compartment and, at the same time, improves the capability of the cover to be seized.

In a modified embodiment of the present invention, the strip 117 is provided with an additional fixing bar 129 to prevent the batteries 127 from simply falling out of the strip 117.

In an advantageous refinement, the strip 117 is prestressed so that, along with the fixing bar 129, the strip 117 exerts a weak clamping force onto the batteries 127. This clamping force, however, is weaker than the clamping force exerted by the electric contacts 114. What is more, the user can simply remove the batteries from the strip 117 because the batteries no longer are in the tight battery compartment and their front sides are easily accessible, with the result that the user can easily seize the batteries.

In a further embodiment, the cover 103 finally is biased into the open position by means of spring means. Once a release button is pushed, the cover 103 bursts open, whereby the requirements to be met by the manual skills for replacing the batteries are reduced even further. A spring means can, for example, be foamed material which is compressed when the cover is being closed, but also a slightly biased film hinge between the strip 117 and the cover 103.

In a further advantageous embodiment, an indicator showing the correct positioning of the battery or the batteries is attached in the cover 103. Since, contrary to the loose battery compartment covers that have been usual so far, the cover always is in the correct position with regard to the battery compartment, the indicator always shows the correct polarity of the battery or the batteries. Furthermore, an indicator attached in the cover can be more easily recognized by persons with impaired vision than an indicator on the bottom of the battery compartment. To achieve this, the indicator can be configured such that it is tactile or palpable, which is hardly possible with indicators provided on the bottom of tight battery compartments.

FIG. 4 shows a smartphone 130 as an example of an electronic device which has a housing according to the invention.

Although the description of the embodiments always mentions batteries, the present invention is generally also applicable for fuel tanks for fuel cells in mobile electronic devices. To this effect, the term "battery" can also be understood to mean a fuel tank in the wider sense mentioned.

LIST OF REFERENCE NUMBERS

101 Detail
102 Battery compartment
103 Cover
104 Upper edge of the battery compartment
106 Side edge of the cover
107 Arms
108 Openings
109 Second side wall of the battery compartment
111 First side wall of the battery compartment
112,113 Front sides
114 Electric contacts
116 Bottom
117 Strip
118 Top edge of the side wall 111
119 Main surfaces of the cover 103
121 Gripping surfaces
122 Notched bar
123a-c Segments
124a,b Film hinges
126 Recess
127 Batteries
128 Positioning rib
129 Fixing bar
130 Smartphone

The invention claimed is:

1. A housing comprising a battery compartment, which can be closed by a pivotable cover, wherein the cover is detachable from the housing, and wherein a strip, when a battery has been inserted, lies underneath the battery and captively connects the cover to the housing, wherein the strip has a torsion resistance that is sufficient to guide the cover into a correct position relative to the battery compartment on closing.

2. The housing according to claim 1, wherein the strip is fastened to a side edge of the cover and within the battery compartment is fastened to the housing on a first side wall of the battery compartment, being opposite to a second side wall of the battery compartment, at which the cover is hinged.

3. The housing according to claim 1, wherein the cover has arms which engage in openings in the battery compartment in such a way that the cover is pivotably connected to the housing up to a predetermined opening angle of the cover and the cover can be detached from the housing by pivoting beyond the predetermined opening angle.

4. The housing according to claim 3, wherein the arms are designed conical towards their free end.

5. The housing according to claim 1, wherein the cover is pre-stressed by spring means into the open position.

6. The housing according to claim 1, wherein the cover has a non-slip surface structure which provides gripping surfaces.

7. The housing according to claim 1, wherein the strip is a plastic strip composed of a plurality of segments which are connected to one another by joints.

8. The housing according to claim 7, wherein the joints are resilient and bias the plastic strips into a stretched position.

9. The housing according to claim 1, wherein the battery compartment has a recess which receives the strip when the battery is inserted.

10. The housing according to claim 1, wherein the cover is provided with a positioning rib.

11. The housing according to claim 1, wherein the strip has a fixing bar which holds the battery.

12. An electronic device with a housing comprising a battery compartment, which can be closed by a pivotable cover, wherein the cover is detachable from the housing, and wherein a strip, when a battery has been inserted, lies underneath the battery and captively connects the cover to the housing, wherein the strip has a torsion resistance that is sufficient to guide the cover into a correct position relative to the battery compartment on closing.

13. The electronic device according to claim 12, wherein the cover has arms which engage in openings in the battery compartment in such a way that the cover is pivotably connected to the housing up to a predetermined opening angle of the cover and the cover can be detached from the housing by pivoting beyond the predetermined opening angle.

14. The electronic device according to claim 12, wherein the cover is pre-stressed by spring means into the open position.

15. The electronic device according to claim 12, wherein the strip is a plastic strip composed of a plurality of segments which are connected to one another by joints.

16. The electronic device according to claim 12, wherein the electronic device is a remote control.

17. The electronic device according to claim 12, wherein the electronic device is a smartphone.

\* \* \* \* \*